United States Patent [19]

Dopp

[11] 4,180,360
[45] Dec. 25, 1979

[54] BROACH PULLING MECHANISM

[75] Inventor: James W. Dopp, Rochester, Mich.

[73] Assignee: The Babcock & Wilcox Company, New York, N.Y.

[21] Appl. No.: 900,442

[22] Filed: Apr. 26, 1978

[51] Int. Cl.² .............................................. B23B 41/04
[52] U.S. Cl. ..................................................... 409/287
[58] Field of Search ............................ 90/91, 92, 93, 63

[56] References Cited

U.S. PATENT DOCUMENTS

| 2,135,861 | 11/1938 | Thompson | 90/93 |
| 2,165,588 | 7/1939 | Thompson | 90/93 |
| 2,338,989 | 1/1944 | Welte | 90/91 |
| 2,403,100 | 7/1946 | Geren | 90/63 X |

FOREIGN PATENT DOCUMENTS

| 330109 | 12/1920 | Fed. Rep. of Germany | 90/63 |
| 947608 | 1/1964 | United Kingdom | 90/63 |

*Primary Examiner*—Gil Weidenfeld
*Attorney, Agent, or Firm*—Vytas R. Matas; Joseph M. Maguire

[57] ABSTRACT

A broach pulling mechanism is provided utilizing puller jaws which engage with a significantly larger circumferential groove at the end of the broach to pull the broach through a workpiece without any vertical drop of the broach in the puller mechanism during any part of the broaching operation. To accomplish this a piston assembly is mounted at the bottom of the broach pulling mechanism to allow the end of the broach to bottom thereon. The piston assembly is controllably pressurized to lock a wall of the groove of the broach end between the puller jaws and the piston assembly thereby preventing any movement or dropping of the broach due to a loose fit of the jaws with respect to the groove throughout the entire broaching operation.

6 Claims, 5 Drawing Figures

BROACH PULLING MECHANISM

BACKGROUND OF THE INVENTION

1. Field of the Invention

The present invention relates to broaching machinery in general and in particular to puller mechanisms for pulling a broach through a workpiece.

2. Brief Description of the Prior Art

The various types of known vertical pull-down broaching machines depend upon conventional automatic jaw-type puller mechanisms for their successful operation. Such conventional puller mechanisms utilize a series of circumferentially located puller jaws which are moved into and out of engagement with a circumferential groove located at the end of a normal broach tool. The jaws are controllably moved into and out of engagement with the groove by a cammed puller sleeve which is spring-loaded to move with respect to a stationary surface of the broaching machine such as the machine platen in response to movement of the broach into the puller mechanism. The circumferential groove on the broach end is usually made significantly wider than the puller mechanism jaws to allow consistent and positive engagement of the puller jaws with the groove.

During normal broaching operations the force of pulling the broach through the workpiece by the puller mechanism causes the engaged puller jaws to be forced against the top shoulder of the circumferential groove preventing any drop of the broach with respect to the puller jaws. This relationship of the puller jaws pressing against the top shoulder of the circumferential groove will be maintained as long as the pulling force on the broach exceeds the weight of the broach. However, when this stops being the case, the broach will drop vertically by the amount of the available clearance in the circumferential groove with respect to the puller jaws.

This condition occurs in every case of a broaching operation when the last broach cutting tooth has passed through the workpiece. For the majority of broaching jobs this inevitable drop of the broach tool presents no problem. However, there are cases when this dropping action is very detrimental to the success of a broaching operation.

One of such cases is where a heavy broach tool is subjected to a wide variation of broaching forces due to a particular desired design. A fairly common example is a broach taking heavy roughing cuts as it starts through a workpiece and then diminishing to very light finishing cuts during its travel through the workpiece. Depending on the weight of the broach tool in relation to the cutting force upon it, it is possible for the broach to drop while still engaged with the workpiece. Such a drop during engagement with the workpiece causes poor workpiece surface finish leaving chatter marks in the workpiece and erratic workpiece size variation. The machine also suffers due to erratic machine operation causing poor broach life and increasing machine maintenance due to vibration.

Another situation where such dropping during engagement of the broach with the workpiece is detrimental is found in the broaching of internal helical forms such as the helical annulus gears which are a part of every automotive automatic transmission. To broach a helical form the broach tool or workpiece must be rotated to provide the same lead and helix angle as the tool which is being pulled down linearly. Any dropping action of the broach can cause lead helix angle and/or involute form errors in addition to the previously mentioned undesirable factors.

In view of the foregoing, it will be seen that for certain broaching operations it is extremely desirable to have a jaw-type broach puller assembly which, while allowing a significantly larger circumferential groove at the end of the broach then the puller jaws, will prevent any dropping of the broach with respect to the puller jaws during any part of the broaching operation.

SUMMARY OF THE INVENTION the present invention solves the mentioned problems associated with prior art broach pulling mechanisms as well as others by providing a broach puller mechanism which will not suffer from any dropping of the broach during any part of the broaching operation. To accomplish this a piston assembly is located at the bottom of the broach pulling mechanism. When the broach is lowered into the puller mechanism the piston initially functions as a stop preventing any further drop of the broach into the broach puller and aligning the broach with the puller jaws. When the puller jaws close in around the broach into the circumferential groove of the broach the piston assembly is actuated to raise the piston thereby forcing the broach end up against the puller jaws effectively clamping the broach to the puller mechanism and eliminating any possible movement of the broach with respect to the puller jaws by virtue of the clamping of the shoulder of the circumferential groove betweeen the jaws and the piston assembly. This locking of the broach to the pulling mechanism prevents any drop throughout the entire broaching operation.

In view of the foregoing, it will be seen that one aspect of the present invention is to provide a broach pulling mechanism which will prevent any drop of the broach throughout the broaching operation.

Another aspect of the present invention is to provide a piston assembly to clamp the end of a broach to the jaws of a puller mechanism during the entire broaching operation.

These and other aspects of the present invention will be more clearly understood upon a perusal of the following description of the preferred embodiment with the accompanying drawings.

DESCRIPTION OF THE PREFERRED EMBODIMENT

Figure 1:
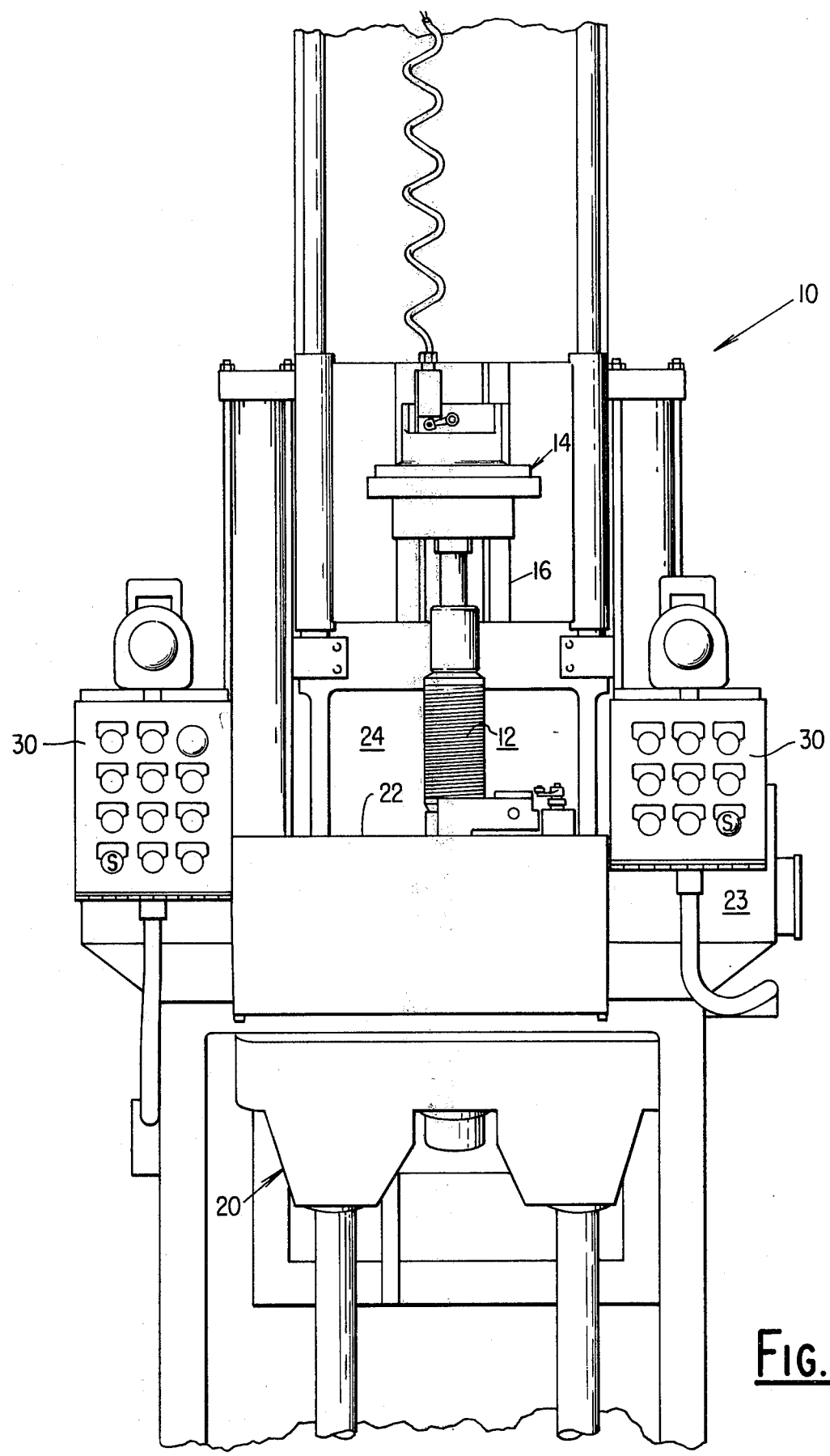
FIG. 1 is a front view of a broaching machine utilizing the present invention.
Figures 2, 5:
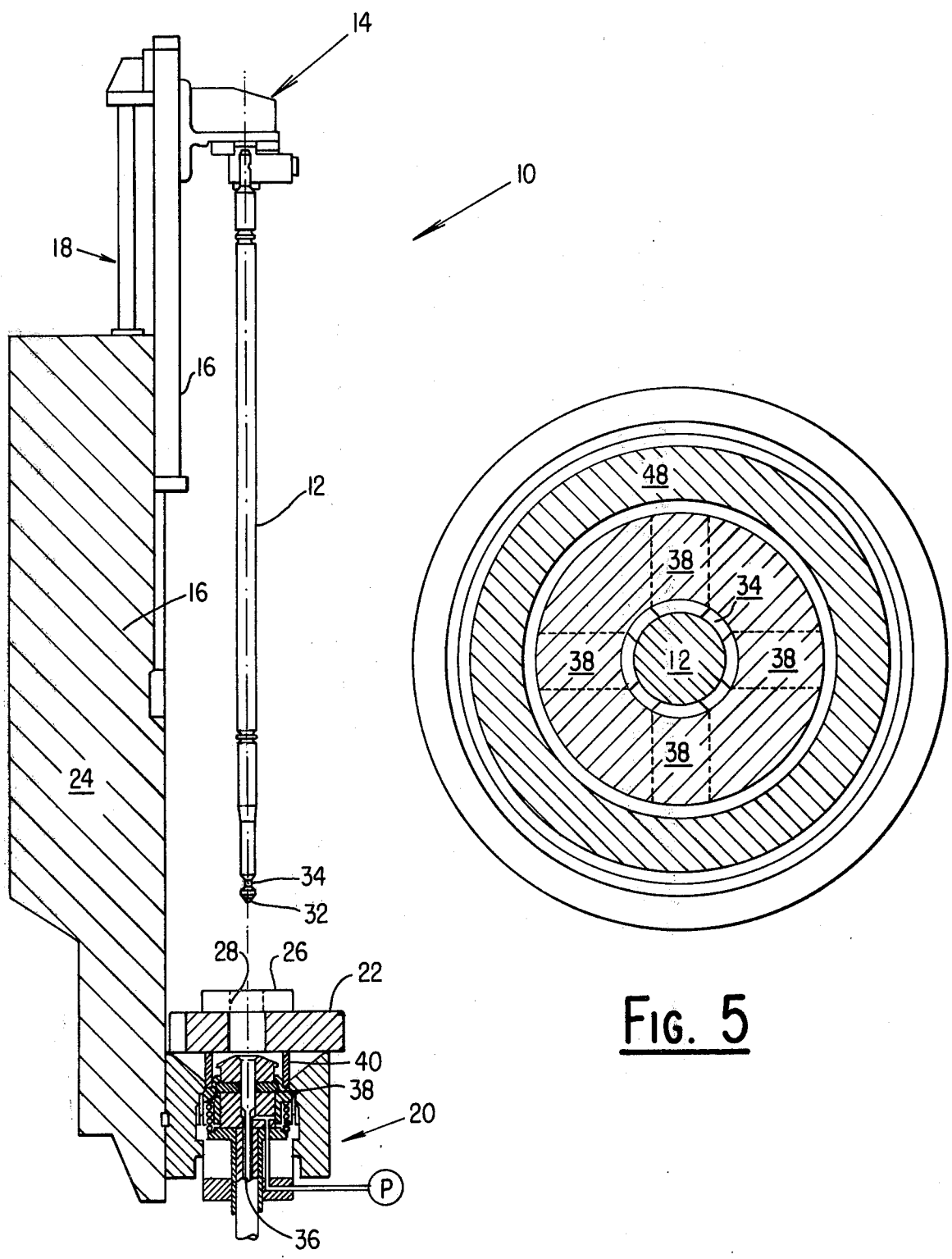
FIG. 2 is a side view of the broaching machine of FIG. 1.
FIG. 5 is a cross-sectional view taken along section 5—5 of the puller mechanism of FIG. 4.

Referring now to the drawings wherein the showing is for purposes of describing a preferred embodiment of the present invention and are not intended to limit the invention thereto, FIGS. 1 and 2 show a vertical pull down broaching machine 10 having a broaching tool 12 connected to a retriever assembly 14 located at the top end of a known piggy-back slide 16 centrally located on the broaching machine 10. The slide 16 is vertically movable up and down in response to controlled pressure signals applied to a piston assembly 18 in a well known manner. The opposite end of the piggy-back slide 16 is connected to a broach puller assembly 20. A stationary machine platen 22 is rigidly affixed to the machine frame 23 of the broaching machine 10 between the retriever assembly 14 and the puller assembly 20. A workpiece 26 is manually or automatically placed on the platen 22 and is broached along its center opening 28 by having the puller assembly 20 engage the broaching tool 12, in a manner that will be explained later, and draw it through the center opening 28 of the workpiece 26.

As may be best seen in FIG. 2, the broach 12 is connected to the retriever assembly 14 with the slide 16 and the retriever assembly 14 being in its uppermost position. The broach 12 is thus easily able to clear the platen 22 and any workpiece 26 that may be placed on the platen 22. To initiate the broaching operation the proper control switches S are actuated on the broaching machine 10 control panel 30. The top portion of slide 16 mounting the retriever assembly 14 starts moving down in response to these control signals until an end 32 of the broach 12 having a circumferential groove 34 engages with the puller assembly mounted on the opposite end of the slide 16. This engagement is accomplished by virtue of the slide 16 being a well-known piggy-back or compound slide assembly which will allow a limited motion of the top of the slide 16 mounting the retriever assembly 14 to slide into itself before locking the broach to the puller assembly 20. The piggy-back slide 16 thereafter moves as a single unit.

The forementioned compound movement of the slide 16 allows the end 32 of the broach 12 to go through the center opening 28 of the workpiece 26 until the end 32 bottoms on a piston assembly 36 thereby aligning the circumferential groove 34 of the broach 12 with a series of puller jaws 38 which are maintained in a retracted position by virtue of the puller assembly 20 being forced up against a stationary spring compressing ring 40 permanently affixed to the platen 22.

Figures 3, 4:
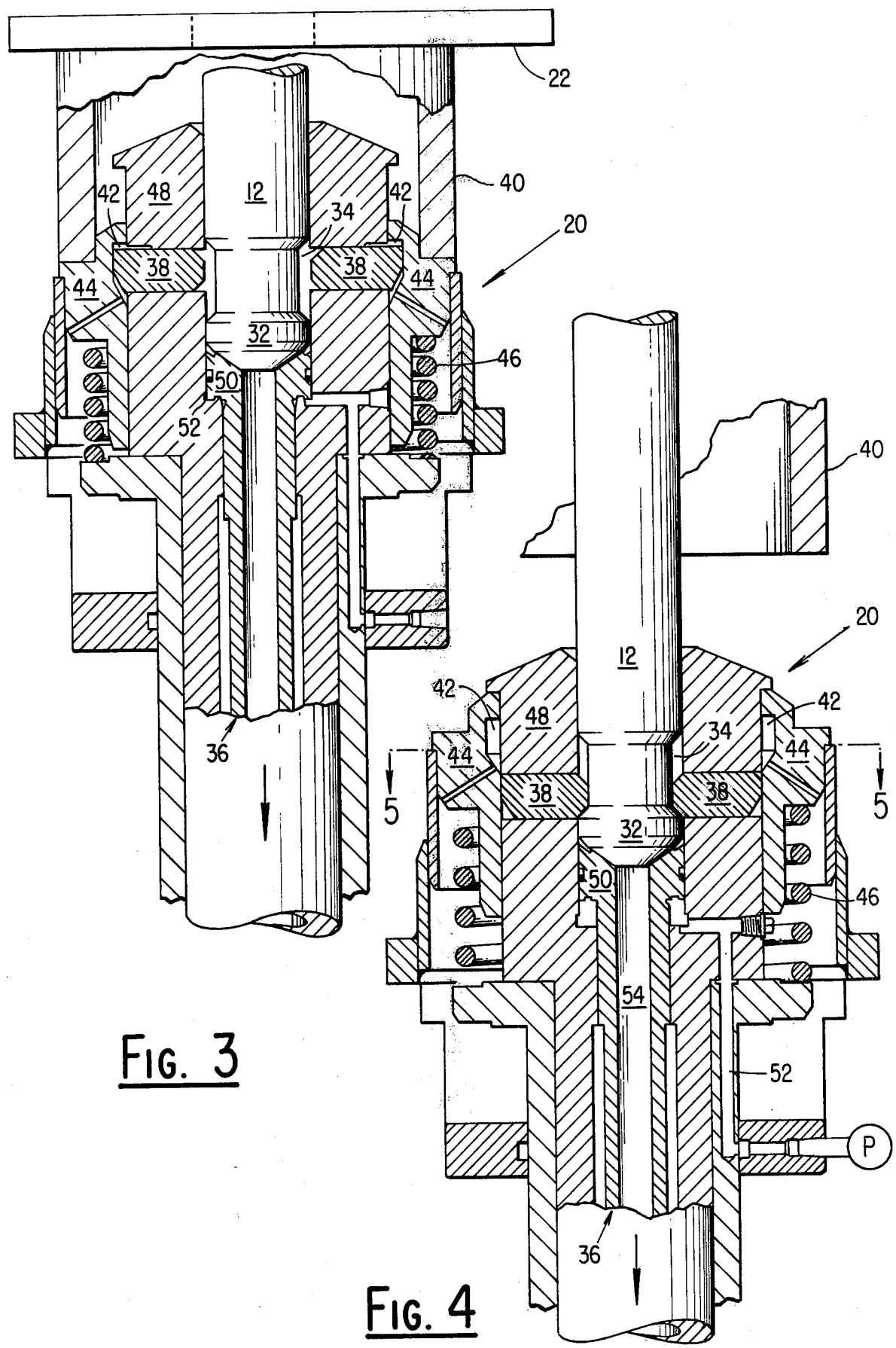
FIG. 3 is an expanded view of the puller mechanism of the broaching machine of FIGS. 1 and 2 with the broach dropped into the puller mechanism.
FIG. 4 is the puller mechanism of FIG. 3 showing the broach locked into engagement with the puller mechanism.

The broaching machine 10 is now ready to initiate the broaching operation. Turning to FIGS. 3 through 5, it will be seen that the puller jaws 38 are initially maintained out of engagement with the groove 34 of the broach 12 since they are able to rest in a grooved cam portion 42 of a puller sleeve 44. It will be noted that the sleeve 44 is spring-loaded by a spring 46 which is compressed due to the puller assembly 20 being in its uppermost position wherein the sleeve 44 is forced down along a puller body 48 by the stationary ring 40 extending from the platen 22. As was mentioned, the piston assembly 36 initially acts as a bottom for the broach 12 aligning the groove 34 with the puller jaws 38. This is accomplished by providing the piston assembly 36 with a piston head 50 which bottoms on a shoulder 52 of the puller body 48. With particular emphasis to FIGS. 4 and 5, it will be noted that beyond the FIG. 3 position of the broach 12 with respect to the puller assembly 20 the compound or piggy-back slide 16 will move as a single unit causing the retriever assembly 14 and the puller assembly 20 to move in unison to pull the broach 12 through the workpiece 26. As the puller assembly 20 is moved away from the ring 40 the spring 46 causes the sleeve 44 to move up along the puller body 48 causing the puller jaws 38 to be forced into the circumferential groove 34 of the broach 12. Once the movement in the downward direction has been sufficient to allow the spring 46 to move the sleeve 44 enough to engage the jaws 38 with the groove 34 the piston assembly 36 is pressurized by admitting hydraulic fluid from a source P along hydraulic lines 52 formed in the body 48 of the piston assembly 20 to pressurize the area around the head 50 of the piston assembly 36 causing it to exert a force against the end 32 of the broach 12 which will lock the broach 12 in the puller assembly 20 between the jaws 38 and the piston head 50. This locking of the broach 12 to the puller assembly 20 prevents the broach 12 from dropping into the puller assembly 20 throughout any part of the broaching operation thereby eliminating any and all of the previously mentioned problems associated with prior art broach puller mechanisms which allowed the broach to drop into the puller assembly towards the end of the broaching operation.

The broaching of the workpiece 26 is now initiated and the broach 12 is pulled completely through the workpiece 26, detached from the retriever assembly 14, and the workpiece 26 removed. When this is accomplished the movement of the slide 16 is reversed and the broach 12 is now reattached to the retriever assembly 14 and moved until it again is moved to the FIG. 2 position. An unfinished blank workpiece 26 may be placed on the platen 22 to repeat the forementioned broaching operation. The piston assembly 36 is made hollow to allow any chips from the broaching operation to drop through the passageway 54 of the piston assembly 36.

Certain modifications and improvements will occur to those skilled in the art upon reading this specification. It will be understood that all such improvements and modifications have been deleted herein for the sake of conciseness and readability but are properly intended to be within the scope of the following claims.

I claim:

1. A puller mechanism for pulling a broach through a workpiece comprising:
    a support for mounting a workpiece thereon;
    a broach having a circumferential groove near the end thereof mounted with respect to said support to be movable through the workpiece; and
    broach pulling means movably mounted with respect to said support including a series of movable puller jaws and further including piston means located in said broach pulling means and axially spaced from said puller jaws to support said broach in a position which aligns the circumferential groove of said broach with respect to the puller jaws when said broach is initially inserted into said broach pulling means and means for actuating said piston means axially toward said jaws to clamp the end of said broach between said puller jaws and said piston means whenever said jaws are moved into said circumferential groove of the broach to allow the broach to be pulled through the workpiece without any drop of the broach with respect to the broach pulling means during any part of the movement of the broach through the workpiece.

2. A broach pulling mechanism as set forth in claim 1 wherein said piston means includes a hydraulic piston located at the end of said broach pulling means.

3. A broach pulling mechanism as set forth in claim 1 wherein said broach is located at the top of said support with said broach pulling means being located on the opposite end of said support.

4. A broach pulling mechanism as set forth in claim 3 including a compound slide mechanism having a broach holding end located at one end of said slide and said broach pulling means located at the opposite end of said slide, said slide mechanism being able to move only said broach holding member with respect to said broach pulling means to insert said broach into said broach pulling means with said slide moving as a single unit thereafter to draw the broach through the workpiece.

5. A broach pulling mechanism as set forth in claim 4 wherein said broach pulling means includes a cammed puller sleeve located around said puller jaws to cause said puller jaws to move into and out of engagement with said circumferential groove of the broach depending on the position of said puller sleeve with respect to said jaws.

6. A broach pulling mechanism as set forth in claim 5 wherein said puller sleeve is spring-loaded to move said puller jaws into engagement with said circumferential groove of the broach during the initial movement of the broach pulling means.

* * * * *